United States Patent
Crowley et al.

(10) Patent No.: US 7,397,239 B2
(45) Date of Patent: Jul. 8, 2008

(54) PASSENGER SCREENING SYSTEM AND METHOD

(75) Inventors: Christopher W. Crowley, San Diego, CA (US); Oscar Mitchell, San Diego, CA (US); Todor Petrov, Santee, CA (US)

(73) Assignee: GE Security, Inc., Bradenton, FL (US)

( * ) Notice: Subject to any disclaimer, the term of this patent is extended or adjusted under 35 U.S.C. 154(b) by 113 days.

(21) Appl. No.: 11/456,731

(22) Filed: Jul. 11, 2006

(65) Prior Publication Data

US 2008/0012560 A1   Jan. 17, 2008

(51) Int. Cl.
*G01V 3/00* (2006.01)

(52) U.S. Cl. .................. 324/300; 324/322

(58) Field of Classification Search ............ 324/300, 324/318, 322
See application file for complete search history.

(56) References Cited

U.S. PATENT DOCUMENTS

| | | | |
|---|---|---|---|
| 4,344,074 A * | 8/1982 | Strosser et al. | 340/684 |
| 4,348,587 A | 9/1982 | Tangonan et al. | |
| 4,422,166 A | 12/1983 | Klein | |
| 5,065,093 A | 11/1991 | Nauta et al. | |
| 6,043,647 A | 3/2000 | Shih | |
| 6,469,624 B1 * | 10/2002 | Whan et al. | 340/551 |
| 6,541,966 B1 | 4/2003 | Keene | |
| 6,914,552 B1 | 7/2005 | McEwan | |
| 6,952,163 B2 * | 10/2005 | Huey et al. | 340/521 |
| 7,030,759 B2 | 4/2006 | Nelson | |
| 7,227,466 B2 | 6/2007 | Nelson | |
| 2007/0229069 A1 * | 10/2007 | Laubacher | 324/300 |

* cited by examiner

*Primary Examiner*—Louis M Arana
(74) *Attorney, Agent, or Firm*—Eugene Hyun, Esq.; Armstrong Teasdale LLP (57) ABSTRACT

A screening system including a first modality comprising at least one inductive sensor, and a second modality including at least one metal detection coil configured to generate a magnetic field, said induction sensor configured to detect a change in the magnetic field generated by the metal detection coil.

24 Claims, 9 Drawing Sheets

PASSENGER SCREENING SYSTEM AND METHOD

BACKGROUND OF THE INVENTION

This invention relates generally to personnel screening systems utilized at passenger terminals, and more particularly, to an integrated passenger screening system.

The Transportation Security Administration (TSA) has recently mandated more stringent inspection procedures be implemented by the travel industry to reduce the possibility of passengers boarding a carrier such as a plane, for example, carrying concealed weapons, explosives, or other contraband. To facilitate preventing passengers boarding a plane carrying concealed weapons, explosives, etc., the TSA requires that all passengers be screened prior to boarding the aircraft.

For example, passengers arriving at the airport terminal first submit to a manual verification process that generally includes presenting their boarding pass and a form of identification such as a driver's license or passport, for example, to security personnel. The security personnel then manually verify that the passenger has a valid boarding pass, the name on the identification corresponds to the name on the boarding pass, and that the picture on the license or passport corresponds to the passenger presenting the license and boarding pass to the security personnel.

After the manual verification process is completed, the passenger is requested to walk through a metal detector to ensure that the passenger is not carrying any concealed weapons. While the metal detector is reasonably effective at detecting specific quantities of metal, the metal detector can not distinguish between a possible weapon or other non-threatening items such as shoes that may include metallic portions. More specifically, known metal detectors may intrepret metallic shanks fabricated into many common shoes as metallic weapons hidden in the shoes or on the ankle/calf region beneath clothing. As a result, metallic portions of known shoes may walk through metal detectors.

Because of the potential for a high false alarm rate, security personnel frequently request that passengers remove their shoes and place their shoes into the baggage screening system such that security personnel can visually verify the metallic object prior to the passenger boarding the plane and to also ascertain whether the shoes may conceal any explosive material or devices. As a result, the known metal detection system is time-consuming for the passengers, and does not distinguish between metallic portions fabricated into many common shoes and metallic weapons hidden in the shoes or near the ankle/calf region of the passenger.

BRIEF DESCRIPTION OF THE INVENTION

In one aspect, a screening system is provided. The screening system includes a first modality comprising at least one inductive sensor, and a second modality including at least one metal detection coil configured to generate a magnetic field, said induction sensor configured to detect a change in the magnetic field generated by the metal detection coil.

In another aspect, a method for assembling a passenger screening system is provided. The method includes mounting a first modality including at least one inductive sensor to the kiosk, and mounting a second modality including a pair of metal detection coils each configured to generate a magnetic field to the kiosk such that the induction sensor is configured to detect a change in the magnetic field generated by the pair of metal detection coils.

DETAILED DESCRIPTION OF THE INVENTION

Figure 1:
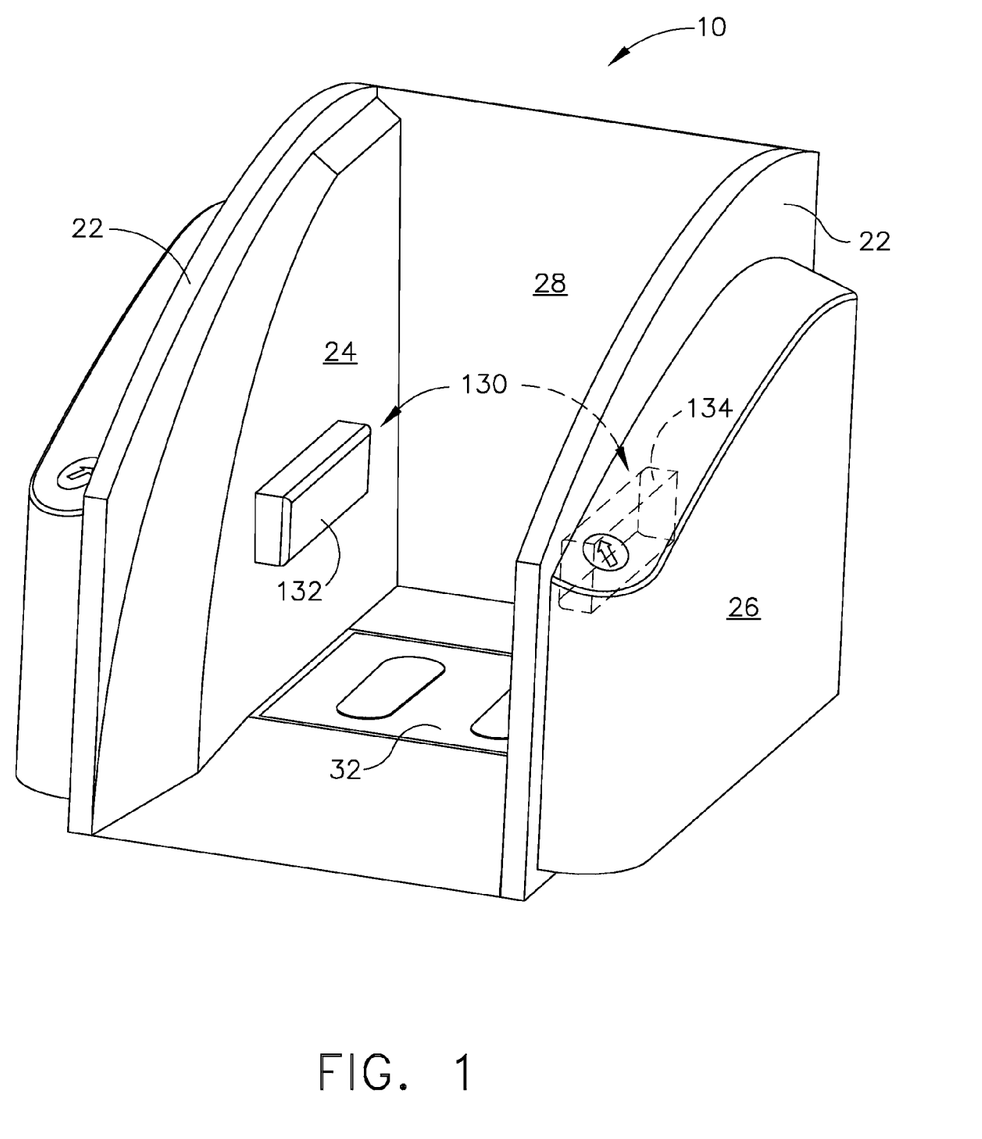
FIG. 1 is a perspective view of an exemplary kiosk system.
Figure 2:
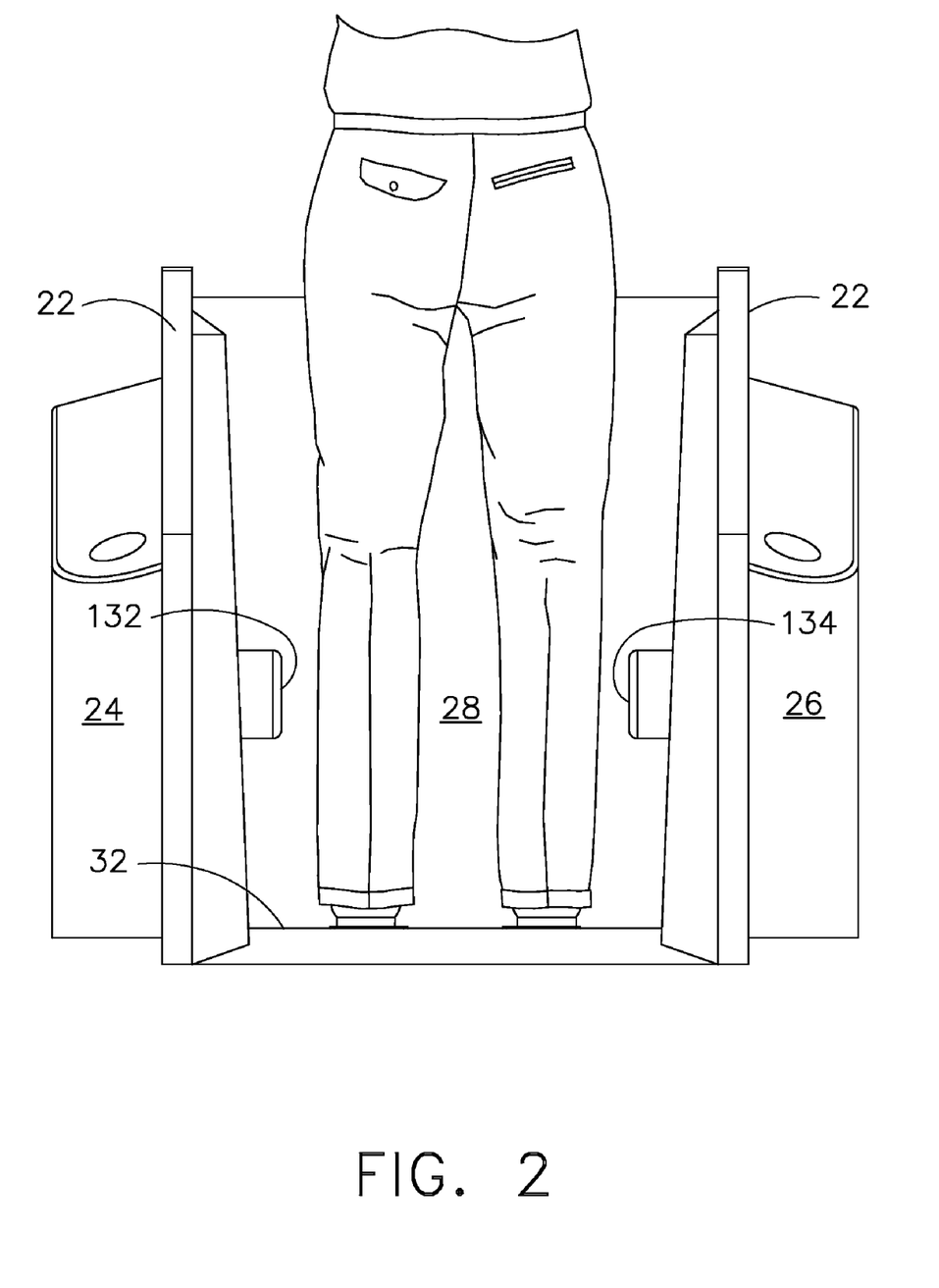
FIG. 2 is a second perspective view of the kiosk system shown in FIG. 1.
Figure 3:
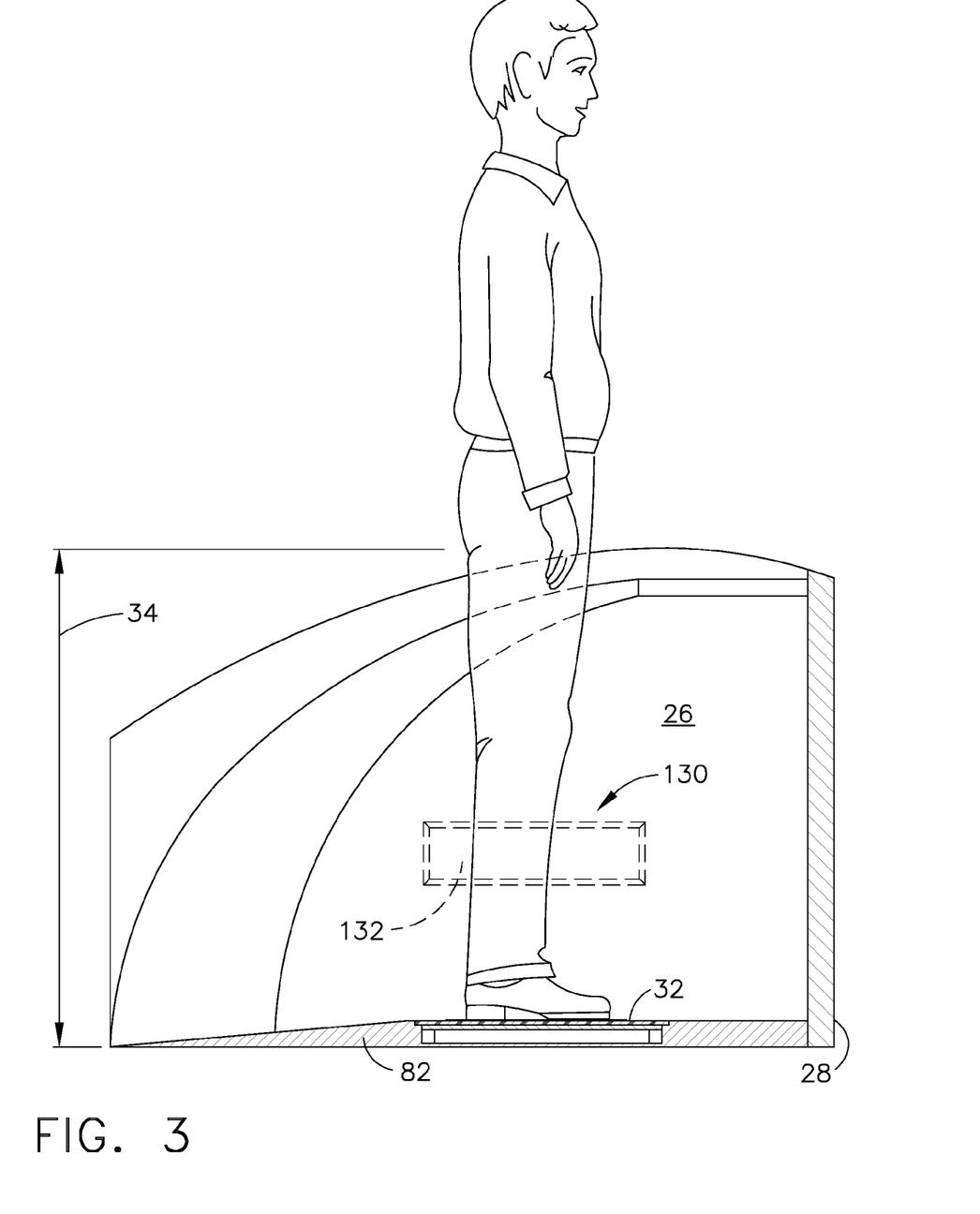
FIG. 3 is a side section view of the kiosk system shown in FIG. 1.
Figure 4:
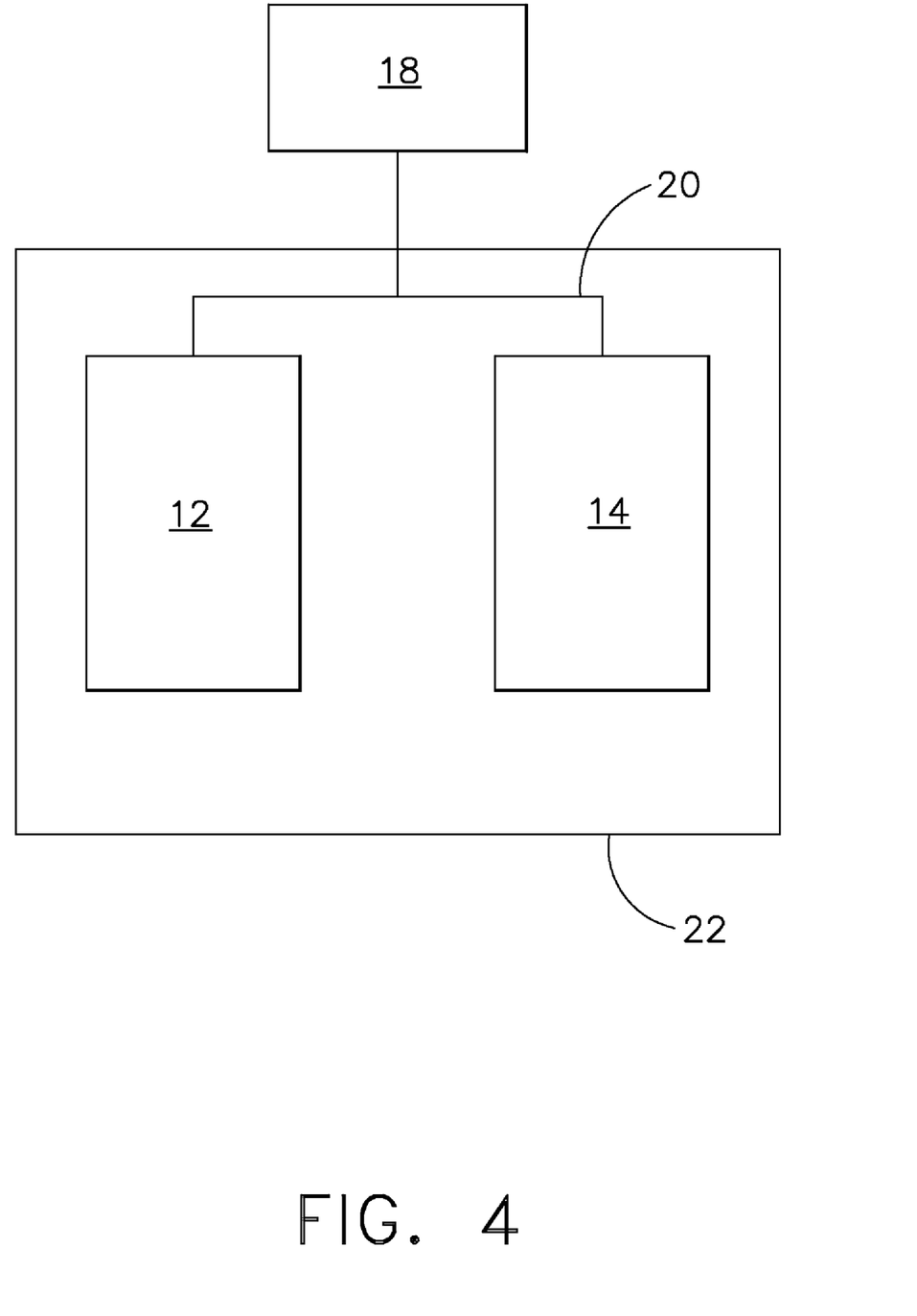
FIG. 4 is a simplified block diagram of an exemplary kiosk security system that includes a first modality and a second modality.

FIG. 1 is a perspective view of an exemplary passenger screening system 10, FIG. 2 is a second perspective view of the passenger screening system shown in FIG. 1, FIG. 3 is a side section view of the passenger screening system 10 shown in FIG. 1, and FIG. 4 is a simplified schematic illustration of the passenger screening system 10. In the exemplary embodiment, system 10 includes at least a first modality 12 referred to herein as an explosive and/or narcotics detection system 12 and a second modality 14 referred to herein as a metal detection system 14. System 10 also includes at least one computer 18, and a communications bus 20 that is coupled between modality 12, modality 14, and computer 18 to enable operator commands to be sent to at least one of modality 12 and/or modality 14 and to allow outputs generated by modality 12 and/or modality 14 to be delivered to computer 18 and thus utilized by computer 18 for data analysis or utilized by an operator of computer 18. In one embodiment, modality 12 and modality 14 are hardwired to computer 18. In another embodiment, communications bus 20 is a local area network. Optionally, communications bus 20 includes an internet connection.

As shown in FIG. 4, modality 12 and modality 14 are integrated into a single screening system 10. In the exemplary embodiment, modality 12, modality 14, and computer 18 are each housed within a single kiosk or housing 22. Optionally, computer 18 is housed separate from kiosk 22 and electrically coupled to modality 12 and modality 14 utilizing bus 20. As used herein, a kiosk is defined as a relatively small area that is at least partially enclosed by at least one wall. In the exemplary embodiment, the kiosk is enclosed by two walls spaced apart in parallel to create a passenger screening area between the two walls. Optionally, the kiosk includes a third, or forward wall, that is coupled between the pair of walls to at least partially enclose the passenger screening area.

In the exemplary embodiment, kiosk 22 includes a first wall 24, a second wall 26 that is positioned substantially parallel to first wall 24, and a third wall 28 that is positioned substantially perpendicular to and coupled between first and second walls 24 and 26, respectively. Kiosk 22 also includes a floor 30 extending between first, second, and third walls 24, 26, and 28, that, in one exemplary embodiment, includes an inductive sensor unit 32 that is described in further detail below. For example, and as shown in FIGS. 1 and 2, the three walls, 24, 26, and 28 define a single opening such that a passenger may enter and exit kiosk 22 through the same opening. Optionally, kiosk 22 may include two walls 24 and 26 such that the passenger may enter kiosk 22 through a first opening, traverse through kiosk 22, and exit kiosk 22 through a second opening. In one embodiment, the kiosk walls each have a height 34 of between approximately 28-42 inches. The embodiments of FIGS. 1, 2, and 3 show the left and right walls 24 and 26 formed with an approximate arcuate shape having a radius which approximates the height of the walls. Note that walls 24 and 26 have been optionally truncated at the entrance. Truncating walls 24 and 26 facilitates the movement of people into and out of system 10, and further extends the notion of openness of the screening system. Optionally, kiosk walls 24 and 26 have a height 34 that is greater than a height of a typical passenger, i.e. like a phone booth for example, such that the entire passenger's body may be screened.

In the exemplary embodiment, modality 12 may be implemented utilizing a quadrupole resonance (QR) detection system 60 that utilizes quadrupole resonance to detect explosives such as, but not limited to C4, Semtex, Detasheet, TNT, ANFO, and/or HMX since the quadrupole resonance signature of these explosives is unique and measurable in seconds.

Nuclear Quadrupole Resonance (NQR) is a branch of radio frequency spectroscopy that exploits the inherent electrical properties of atomic nuclei and may therefore be utilized to detect a wide variety of potentially explosive materials. For example, nuclei having non-spherical electric charge distributions possess electric quadrupole moments. Quadrupole resonance arises from the interaction of the nuclear quadrupole moment of the nucleus with the local applied electrical field gradients produced by the surrounding atomic environment. Any chemical element's nucleus which has a spin quantum number greater than one half can exhibit quadrupole resonance. Such quadrupolar nuclei include: $^{7}Li$, $^{9}Be$, $^{14}N$, $^{17}O$, $^{23}Na$, $^{27}Al$, $^{35}Cl$, $^{37}Cl$, $^{39}K$, $^{55}Mn$, $^{75}As$, $^{79}Br$, $^{81}Br$, $^{127}I$, $^{197}Au$, and $^{209}Bi$. Many substances containing such nuclei, approximately 10,000, have been identified that exhibit quadrupole resonance.

It so happens that some of these quadrupolar nuclei are present in explosive and narcotic materials, among them being $^{14}N$, $^{17}O$, $^{23}Na$, $^{35}Cl$, $^{37}Cl$, and $^{39}K$. The most studied quadrupolar nucleus for explosives and narcotics detection is nitrogen. In solid materials, electrons and atomic nuclei produce electric field gradients. These gradients modify the energy levels of any quadrupolar nuclei, and hence their characteristic transition frequencies. Measurements of these frequencies or relaxation time constants, or both, can indicate not only which nuclei are present but also their chemical environment, or, equivalently, the chemical substance of which they are part.

When an atomic quadrupolar nucleus is within an electric field gradient, variations in the local field associated with the field gradient affect different parts of the nucleus in different ways. The combined forces of these fields cause the quadrupole to experience a torque, which causes it to precess about the electric field gradient. Precessional motion generates an oscillating nuclear magnetic moment. An externally applied radio frequency (RF) magnetic field in phase with the quadrupole's precessional frequency can tip the orientation of the nucleus momentarily. The energy levels are briefly not in equilibrium, and immediately begin to return to equilibrium. As the nuclei return, they produce an RF signal, known as the free induction decay (FID). A pick-up coil detects the signal, which is subsequently amplified by a sensitive receiver to measure its characteristics.

Figure 5:
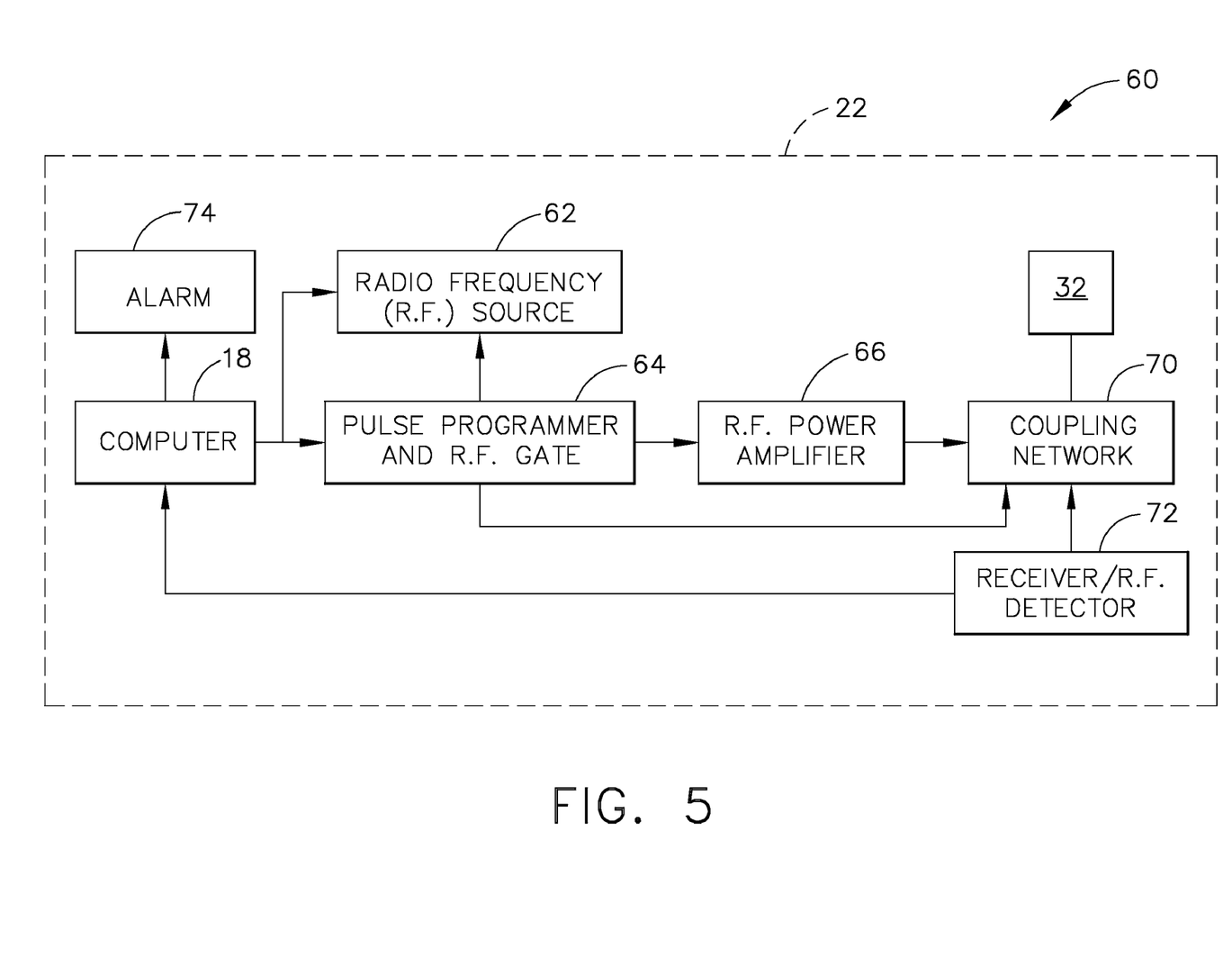
FIG. 5 is a schematic illustration of an exemplary Quadrupole Resonance (QR) screening system that may be utilized with the kiosk shown in FIGS. 1-4.

FIG. 5 is a simplified schematic illustration of an exemplary quadrupole resonance system that may be utilized to implement modality 12. Quadrupole resonance system 60 includes a radio frequency source 62, a pulse programmer and RF gate 64 and an RF power amplifier 66 that are configured to generate a plurality of radio frequency pulses having a predetermined frequency to be applied to a coil such as sensor 32. A communications network 70 conveys the radio frequency pulses from radio frequency source 62, pulse programmer and RF gate 64 and RF power amplifier 66 to sensor 32 that, in the exemplary embodiment, is positioned within kiosk 22. The communications network 70 also conducts the signal to a receiver/RF detector 72 from sensor 32 after the passenger is irradiated with the radio frequency pulses.

Figure 6:
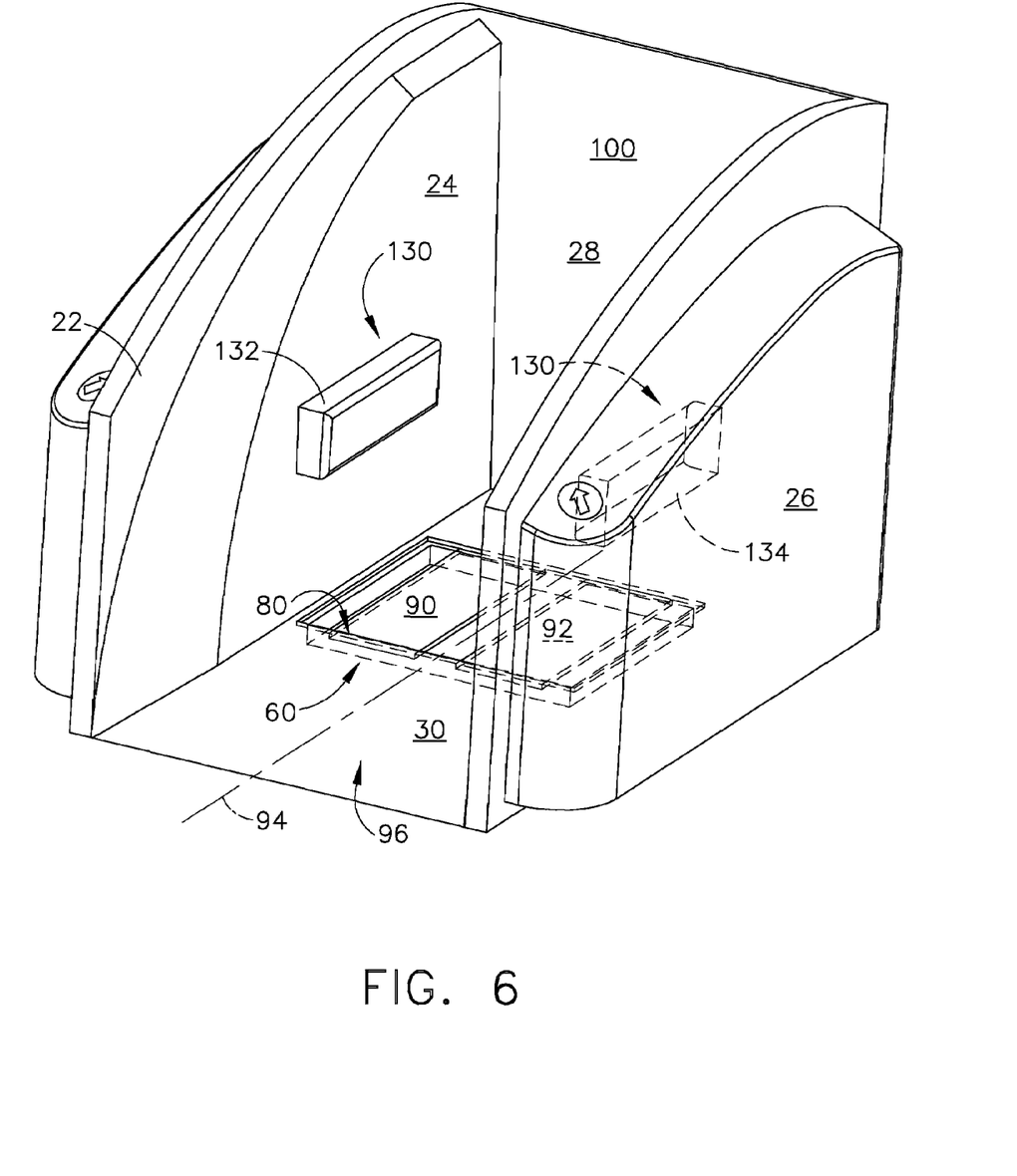
FIG. 6 is a perspective view of the kiosk shown in FIGS. 1-3 including the screening system shown in FIG. 5.

FIG. 6 is a perspective view of kiosk 22 including QR system 60. In the exemplary embodiment, system 60 is configured as a kiosk shoe scanner. As stated above, system 60 includes an inductive sensor 32 that in the exemplary embodiment, is positioned proximate third wall 28 approximately between first and second walls 24 and 26. In accordance with this embodiment, inductive sensor 32 may be positioned within a recessed region 80 of floor 30, between an entrance ramp 82 and third wall 28. This recessed region 80 may also be referred to as the sensor housing. In FIG. 6, the inductive sensor 32 has been omitted to show sensor housing 80, which is recessed within floor 30 of screening system 60.

As shown in FIG. 6, and in the exemplary embodiment, inductive sensor 32 may be implemented using two anti-symmetric current branches 90 and 92 that may be located on opposing sides of a medial plane 94 of system 60. Specifically, current branch 90 is positioned on one side of medial plane 94, while current branch 92 is positioned on the opposite side of medial plane 94.

Inductive sensor 32 may be configured in such a manner that both current branches 90 and 92 experience current flow that is generally or substantially parallel to the left and right walls 24 and 26. For example, the current branches 90 and 92 may be placed in communication with an electrical source (not shown in this figure). During operation, current flows through current branch 90 in one direction, while current flows through current branch 92 in substantially the opposite direction. The term "anti-symmetric current flow" may be used to refer to the condition in which current flows through the current branches in substantially opposite directions.

In the exemplary embodiment, inductive sensor 32 is implemented using a quadrupole resonance (QR) sensor. For convenience only, various embodiments will be described with reference to the inductive sensor implemented as a QR sensor 32, but such description is equally applicable to other types of inductive sensors. Optionally, inductive sensor 32 may be implemented utilizing a nuclear magnetic resonance (NMR) sensor.

Figure 7:
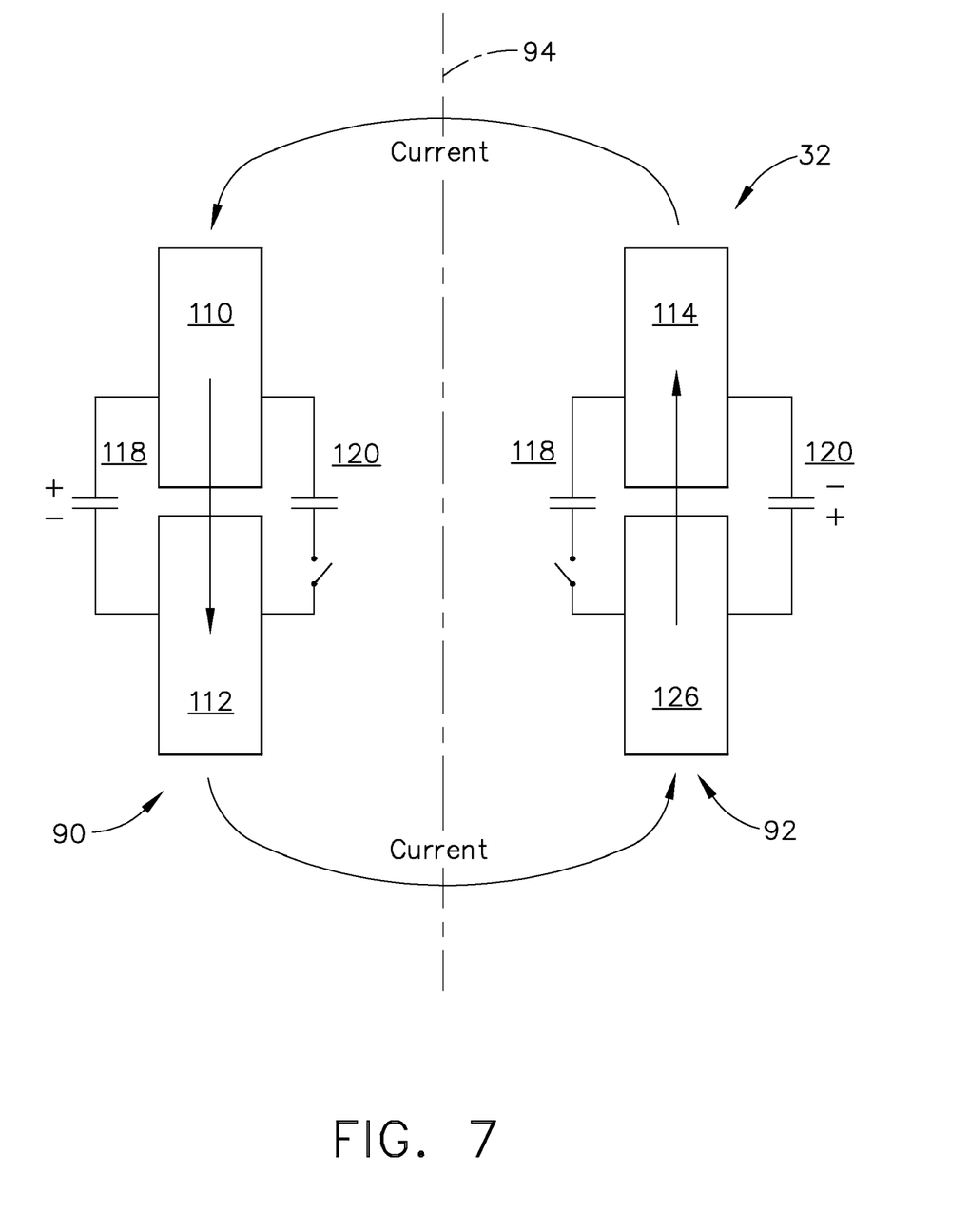
FIG. 7 is a schematic illustration of an exemplary QR induction coil.

In the exemplary embodiment, current branches 90 and 92 collectively define a QR sheet coil that is shown as sensor 32 in FIG. 7. For convenience only, further discussion of the QR sensor will primarily reference a "QR sheet coil," or simply a "QR coil". During a typical screening process, a person enters the system at an entrance 96, and then stands within an screening region defined by QR sensor 32. Specifically, the person may stand with their left foot positioned relative to current branch 90 and their right foot positioned relative to current branch 92. The QR sensor then performs an screening process using nuclear quadrupole resonance (NQR) to detect the presence of a target substance associated with the person.

As shown in FIG. 5, QR sensor 32 is in communication with the RF subsystem, defined generally herein to include radio frequency source 62, pulse programmer and RF gate 64, and RF power amplifier 66 which provides electrical excitation signals to current branches 90 and 92. The RF subsystem may utilize a variable frequency RF source to provide RF excitation signals at a frequency generally corresponding to a predetermined, characteristic NQR frequency of a target substance. During the screening process, the RF excitation signals generated by the RF source may be introduced to the specimen, which may include the shoes, socks, and clothing present on the lower extremities of a person standing or otherwise positioned relative to the QR sensor 32. In the exemplary embodiment, the QR coil 32 also functions as a pickup coil for NQR signals generated by the specimen, thus providing an NQR output signal which may be sampled to determine the presence of a target substance, such as an explosive, utilizing computer 18, for example.

In the exemplary embodiment, QR sensor 32 utilizes an EMI/RFI (electromagnetic interference/radio frequency interference) shield to facilitate shielding sensor 32 from external noise, interference and/or to facilitate inhibiting RFI from escaping from the screening system during an screening process. In the exemplary embodiment, walls 24, 26, and 28 are configured to perform RF shielding for QR sensor 32. Specifically, walls 24, 26, and 28 are electrically connected to each other, to entrance ramp 82, and to sensor housing 80 to form an RF shield 100.

Each of the shielding components, i.e. walls 24, 26, and 28 may be fabricated from a suitably conductive material such as aluminum or copper. Typically, the floor components, i.e. ramp 82 and sensor housing 80 are welded together to form a unitary structure. Additionally, walls 24, 26, and 28 may also be welded to the floor components, or secured using suitable fasteners such as bolts, rivets, and/or pins. QR sensor 32 may be secured within sensor housing 80 using, for example, any of the just-mentioned fastening techniques. If desired, walls 24, 26, and 28, entrance ramp 82, and the QR sensor 32 may be covered with non-conductive materials such as wood, plastic, fabric, fiberglass, and the like.

FIG. 7 is a simplified schematic illustration of the exemplary QR sensor 32 shown in FIG. 6. Left current branch 90 is shown having upper and lower conductive elements 110 and 112, which are separated by a non-conductive region. Similarly, right current branch 92 includes upper and lower conductive elements 114 and 116, which are also separated by a non-conductive region. The left and right current branches 90 and 92 collectively define the QR coil of sensor 32, and may be formed from any suitably conductive materials such as copper or aluminum, for example.

No particular length or width for the current branches 90 and 92 is required. In general, each current branch may be dimensioned so that it is slightly larger than the object or specimen being inspected. Generally, current branches 90 and 92 are sized such that a person's left foot and right foot (with or without shoes) may be respectively placed in close proximity to the left and right current branches 90 and 92. This may be accomplished by the person standing over the left and right current branches. In this scenario, the left and right branches may each have a width of about 4-8 inches and a length of about 12-24 inches. It is to be understood that the terms "left" and "right" are merely used for expositive convenience and are not definitive of particular sides of the structure.

Upper and lower conductive elements 110 and 112 are shown electrically coupled by fixed-valued resonance capacitor 118 and tuning capacitor 120, which is a switched capacitor that is used to vary tuning capacitance. Upper and lower conductive elements 114 and 116 may be similarly configured.

FIG. 7 also includes several arrows which show the direction of current flow through the left and right current branches 90 and 92 which in the exemplary embodiment, is in a counter-clockwise direction. During operation, current flows through left current branch 90 in one direction, while current flows through right current branch 92 in substantially the opposite direction. The reason that current flows through the two current branches in opposite directions is because the left and right current branches 90 and 92 each have a different arrangement of positive and negative conductive elements. For instance, left current branch 90 includes a positive upper conductive element 110 and a negative lower conductive element 112. In contrast, right current branch 92 includes a negative upper conductive element 114 and a positive lower conductive element 116. This arrangement is one example of a QR sensor providing counter-directed or anti-symmetric current flow through the current branches.

In accordance with the exemplary embodiment, current flows between the left and right current branches 90 and 92 during operation since these components are electrically coupled via ramp 82 and the sensor housing 80. During operation, a person may place their left foot over left current branch 90 and their right foot over right current branch 92. In such a scenario, current is directed oppositely through each branch resulting in current flowing from toe to heel along left current branch 90, and from heel to toe along right current branch 92. In the exemplary embodiment, QR sensor 32 is positioned within sensor housing 80 to form a non-conductive gap between current branches of the QR sensor. This gap allows the magnetic fields to circulate about their respective current branches.

In contrast to conventional inductive sensor systems, the counter-directed magnetic fields generated by QR sensor 32 are well-attenuated and have a topography that is especially suited for use with a kiosk that includes a first wall 24, a second wall 26 that is opposite to first wall 24, and a third wall 28 that is substantially perpendicular to first and second walls 24 and 26, and a floor 30 that is connected to first wall 24, second wall 26, and third wall 28.

As an example of a practical application, the left and right current branches 90 and 92 may be positioned about 2-7 inches from respective walls 24, 26, and 28 using a plurality of non-conductive regions. In addition, current branches 90 and 92 may be positioned about 4-14 inches from each other using a non-conductive region.

Operation of QR screening system 60 in accordance with embodiments of the invention may proceed as follows. First, a person may be directed to enter QR screening system 10 at entrance ramp 82. The person proceeds up entrance ramp 82 and stands with their feet positioned over QR sensor 32. To maximize the accuracy of the screening process, the person may stand with their left foot positioned over left current branch 90 and their right foot over right current branch 92. The person will then be prompted by modality 12 to complete the verification screening process as described above. After the verification screening process is completed, modality 12 may prompt a passenger to ensure that their left foot is positioned over left current branch 90 and their right foot is positioned over right current branch 92. In the exemplary embodiment, labels are attached to the floor indication where the passenger's feet should be placed.

At this point, the lower extremities of the person are QR scanned by the inductive sensor 32 to determine the presence of a target substance such as, for example, an explosive, contraband, an illegal drug, a controlled substance, or a conductive object. In the case of QR detectable objects, this may be accomplished by a QR sensor providing RF excitation signals at a frequency generally corresponding to a predetermined, characteristic NQR frequency of the target substance. Note that the excitation frequency need not be exactly the same as the target substance NQR frequency, but it is typically within about 500-1000 Hz. The resonant frequencies of the various target substances that may be detected using NQR are well known and need not be further described. After the threat screening is completed, system 10 will direct the passenger to exit the kiosk 22.

Figure 8:
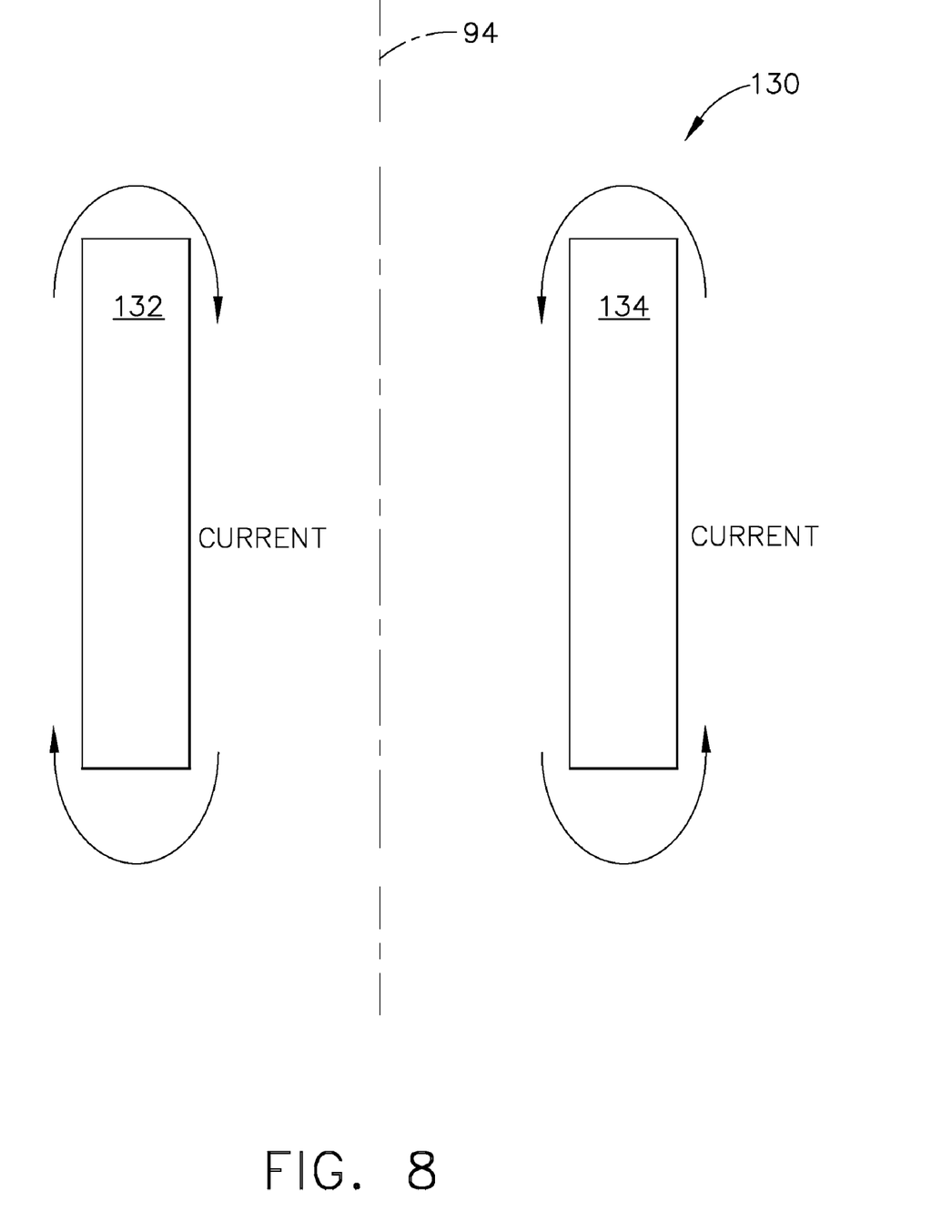
FIG. 8 is a schematic illustration of a pair of exemplary metal detection coils.

In the exemplary embodiment, system 60 may also be utilized to implement the second modality 14. Specifically, portions of system 60 are utilized to perform passenger metal detection. As such, and in the exemplary embodiment, passenger screening system 10 also includes a pair metal detection coils 130 that are utilized in conjunction with inductive sensor 32. Each of the metal detection coils 130 may be configured to detect conductive objects present within the vicinity of the lower extremities of the inspected person. These signals may be communicated to a suitable computing device for example computer 18. More specifically, and as shown in FIG. 6, system 10 includes a first metal detection coil 132 and a second metal detection coil 134 that are each mounted to a side of kiosk 22. Specifically, first metal detection coil 132 is mounted to an inner surface of first wall 24 and second metal detection coil 134 is mounted to an inner surface of second wall 26. In the exemplary embodiment, metal detection coils 132 and 134 are each mounted at a height above floor 30 to is most advantageous to conduct a metal detection screening of the lower extremities of the passenger. For example, coils 132 and 134 may be positioned approximately 12-40 inches above floor 30. In the exemplary embodiment, metal detection coils 132 and 134 are inductive coils such that when a first current flows through the first metal detection coil 132 in a first direction a first magnetic field is formed, and when the current flows through the second metal detection coil, in a second opposite direction, a second magnetic field is formed FIG. 8 is a simplified schematic illustration of the metal detection coils 132 and 134 shown in FIG. 6. Coil 132 and coil 134 are each separated by a non-conductive region 136 which generally is the utilized for the passenger, i.e. the passenger is positioned between coils 132 and 134 to facilitate operation of the system. Coils 132 and 134 may be formed from any suitably conductive materials such as copper or aluminum, for example, and no particular length or width for the coils 132 and 134 is required. In general, each coil is dimensioned so that it is slightly larger than the object or specimen being inspected. It is to be understood that the terms "left" and "right" are merely used for expositive convenience and are not definitive of particular sides of the structure.

FIG. 8 also includes several arrows which show the direction of current flow through the left and right coils 132 and 134. During operation, current flows through left coil 132 in one direction, while current flows through right coil 134 in substantially the opposite direction. The reason that current flows through the two current branches in opposite directions is because the left and right current branches 130 and 132 each have a different arrangement of positive and negative conductive elements. Although, an exemplary metal detection coil 130 is described herein, it should be realized that a wide variety of coils types may be utilized.

During operation, a passenger is positioned between the first and second coils 132 and 134, respectively. In such a scenario, current is directed oppositely through each coil resulting in current flowing in a heel-to-toe direction along right coil 134, and from heel-to-toe along left coil 132. In the exemplary embodiment, coils 132 and 134 are each positioned within kiosk 22 to form a non-conductive gap between coils to allow the magnetic fields to circulate about their respective current branches.

More specifically, current is supplied to coils 132 and 134 utilizing a line driver circuit or a signal driver, for example, such that each coil 132 and 134 generates a magnetic field. Accordingly, the current supplied to coils 132 and 134 causes a magnetic field to be generated around each respective coil. In the exemplary embodiment, the QR sensors 32 are utilized to monitor or detect any changes in the magnetic field generated by coils 132 and 134. More specifically, when no metallic object is positioned between coils 132 and 134, the coils are substantially balanced. That is, a balanced or null signal is injected into the QR sensors 32 such that QR sensors 32 do not detect any imbalance between coils 132 and 134. However, if a passenger, carrying a metallic object is positioned between coils 132 and 134, the signals generated by coils 132 and 134 will become unbalanced, i.e. a signal having some amplitude, will be detected by QR sensor 32. Accordingly, when system 10 is configured to operate modality 14, i.e. the metal detection modality, QR sensors 32 are electromagnetically the QR driver circuit to enable the QR sensors 32 to detect any disturbances in the magnetic field generated by coils 132 and 134.

In the exemplary, embodiment, metal detection coils 132 and 134 are each calibrated to ensure that they are substantially in balance, i.e. produce a magnetic field of similar strength, when no metallic object is positioned between them. Moreover, QR sensor 32 is calibrated to identify and changes in the magnetic field generated by coils 132 and 134. As such, and in the exemplary embodiment, QR sensor 32 is utilized to detect any changes in the magnetic fields generated by coils 132 and 134. In the exemplary embodiment, when the QR sensors detects a change in the magnetic fields generated by coils 132 and 134 has exceeded a predetermined threshold, an alarm or other indication will be enabled to prompt an operator that a metallic object has been detected and further, more detailed screening of the passenger may be required.

Figure 9:
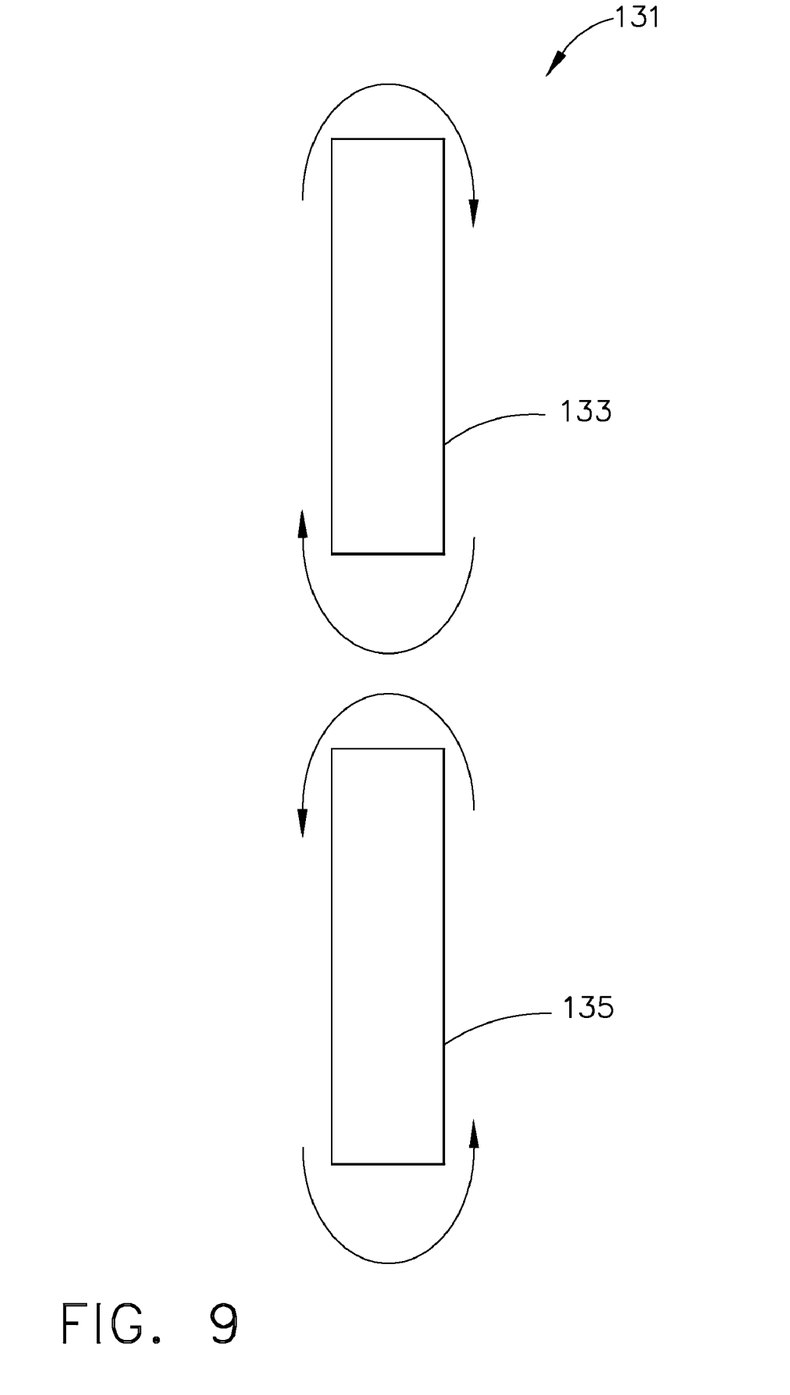
FIG. 9 is a schematic illustration of another exemplary metal detection coil.

FIG. 9 is a schematic illustration of another exemplary metal detection coil 131. More specifically, metal detection coil 131 may be used in lieu of metal detection coils 132 and 134 described above. In the exemplary embodiment, metal detection coil 131 is mounted to either the right or left side wall of kiosk 22, and includes a forward and a rearward coil 133 and 135, respectively, which are separated by a non-conductive region. During operation, metal detection coil 131 performs substantially the same function as the pair of metal detection coils 130 (shown in FIG. 7).

Specifically, forward and rearward conductive coils 133 and 135 are each calibrated to ensure that they are substantially in balance, i.e. produce a magnetic field of similar strength, when no metallic object is positioned between them. Moreover, QR sensor 32 is calibrated to identify and changes in the magnetic field generated by forward and rearward coils 133 and 135. As such, and in the exemplary embodiment, QR sensor 32 is utilized to detect any changes in the magnetic fields generated by forward and rearward coils 133 and 135. In the exemplary embodiment, when the QR sensors detects a change in the magnetic fields generated by forward and rearward conductive coils 133 and 135 has exceeded a predetermined threshold, an alarm or other indication will be enabled to prompt an operator that a metallic object has been detected and further, more detailed screening of the passenger may be required.

Although the exemplary passenger screening modalities 14 described herein are generally directed toward scanning the lower region of the passenger while the passenger is still wearing shoes, it should be realized that at least some of modalities 14 may be implemented to scan the entire passenger with or without the passenger wearing shoes. Such systems include for example, whole body QR scanning, whole body metal detection, whole body trace explosive detection, and whole body metal detection.

Described herein is a kiosk that includes a modality utilized to perform explosives and or drug detection, and a second modality that is utilized to perform metal detection. In the exemplary embodiment, selected signals generated by the second or metal detection modality are received by the first or QR modality. Specifically, when the system is operated in the second modality, the QR coils are utilized to detect any changes in the metal detection coils. As a result, any metallic object that is positioned between the metal detection coils and the QR coils will cause a disturbance in the magnetic field generated by the metal detection coils. This disturbance results in an imbalance between the metal detection coils, resulting in a signal being transmitted to the QR coils indicating the presence of metal.

While the invention has been described in terms of various specific embodiments, those skilled in the art will recognize that the invention can be practiced with modification within the spirit and scope of the claims.

What is claimed is:

1. A screening system, comprising:
   a first modality comprising a quadrupole resonance detection system including at least one inductive sensor; and
   a second modality comprising at least one metal detection coil configured to generate a magnetic field, said induction sensor configured to detect a change in the magnetic field generated by said metal detection coil.

2. A screening system in accordance with claim 1 wherein said system comprises a floor, a first sidewall, and an opposite second sidewall, each of said sidewalls extending substantially vertically from said floor.

3. A screening system in accordance with claim 2 further comprising a first metal detection coil mounted to said first sidewall and a second metal detection coil mounted to said second sidewall.

4. A screening system in accordance with claim 3 wherein said first metal detection coil has a clockwise current flow and said second metal detection coil has a counterclockwise current flow.

5. A screening system in accordance with claim 4 wherein the coupling between said first metal detection coil and said inductive sensor is equal and opposite to the coupling between said second metal detection coil and said inductive sensor.

6. A screening system in accordance with claim 3 wherein said pair of metal detection coils comprise a pair of inductive coils.

7. A screening system in accordance with claim 6 wherein said pair of metal detection coils are electromechanically disconnected from said inductive sensor.

8. A screening system in accordance with claim 1 wherein said inductive sensor comprises at least two current branches positioned on opposing sides of a medial plane of said floor, said current branches having anti-symmetric current flow.

9. A screening system in accordance with claim 8 wherein each of said current branches comprise an upper conductive element which is separated by a non-conductive gap from a lower conductive element.

10. A screening system in accordance with claim 9 wherein said inductive sensor further comprises:
    a first capacitor electrically coupled to said upper and lower conductive elements of said first branch; and
    a second capacitor electrically coupled to said upper and lower conductive elements of said second branch, said first and second capacitors forming a resonant circuit.

11. A screening system in accordance with claim 10 further comprising:
    an electrical source providing electrical excitation to said inductive sensor, said electrical excitation causing a first current to flow through said first current branch in a first direction such that a first magnetic field is formed, and to flow through said second current branch in a second opposite direction such that a second magnetic field is formed.

12. A screening system in accordance with claim 10 further comprising:
    an electrical source providing electrical excitation to said pair of metal detection coils, said electrical excitation causing a first current to flow through said first metal detection coil in a first direction such that a first magnetic field is formed, and to flow through said second metal detection coil in a second opposite direction such that a second magnetic field is formed.

13. A screening system in accordance with claim 1 further comprising a radio frequency (RF) subsystem comprising a variable frequency RF source in communication with said inductive sensor, said RF source providing RF excitation signals at a frequency generally corresponding to predetermined, characteristic nuclear quadrupolar resonant (NQR) frequency of a target substance, said RF excitation signals being applied to a specimen located within said electromagnetic shield, said inductive sensor functioning as a pickup coil for NQR signals from said specimen and providing an NQR output signal.

14. A screening system in accordance with claim 13 wherein said inductive sensor functions as a pickup coil to detect an imbalance between said pair of metal detections coils.

15. A screening system in accordance with claim 1 wherein said inductive sensor provides electrical excitation to a specimen positioned within said electromagnetic shield, wherein said electrical excitation causes a response indicative of the presence of an explosive substance.

16. A screening system in accordance with claim 1 wherein said inductive sensor is a nuclear quadrupolar resonant (NQR) sensor.

17. A screening system in accordance with claim 1 wherein said inductive sensor is a nuclear magnetic resonance (NMR) sensor.

18. A screening system in accordance with claim 1 wherein said first modality comprises a communication means, said first modality configured to activate said communication means when the change in magnetic field detected by said inductive sensor exceeds a predetermined threshold.

19. A screening system in accordance with claim 18 wherein said communication means comprise at least one of a visual indication, an audio indicator, and an electronic emitted signal.

20. A method for assembling a passenger screening system, said method comprising:
    mounting a first modality a quadrupole resonance detection system including at least one inductive sensor to a kiosk; and
    mounting a second modality including a pair of metal detection coils each configured to generate a magnetic field to the kiosk such that the induction sensor is configured to detect a change in the magnetic field generated by the pair of metal detection coils.

21. A screening system, comprising:
- a first modality comprising a quadrupole resonance detection system including at least one inductive sensor; and
- a second modality comprising a metal detection coil configured to generate a magnetic field, said induction sensor configured to detect a change in the magnetic field generated by said metal detection coil.

22. A screening system in accordance with claim 21 wherein said system comprises a floor, a first sidewall, and an opposite second sidewall, each of said sidewalls extending substantially vertically from said floor.

23. A screening system in accordance with claim 22 wherein said metal detection coil is coupled to one of said first and second sidewalls.

24. A screening system in accordance with claim 22 wherein said metal detection coil comprises:
- a first conductive element; and
- a second conductive element, said first and second conductive elements each configured to generate a magnetic field, said induction sensor configured to detect a change in the magnetic field generated by said first and second conductive elements.

* * * * *